UNITED STATES PATENT OFFICE.

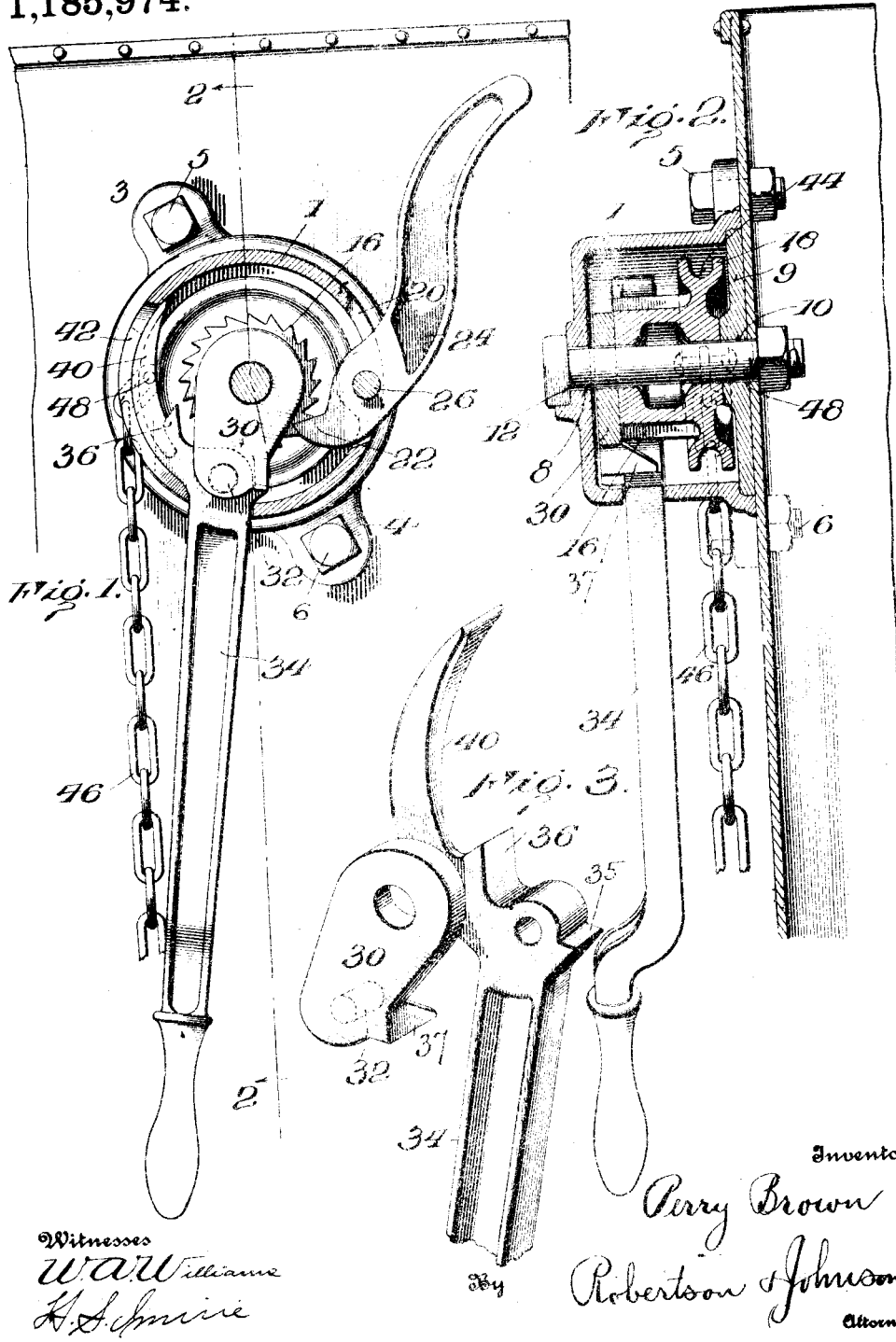

PERRY BROWN, OF CORAOPOLIS, PENNSYLVANIA.

BRAKE.

1,185,974.  Specification of Letters Patent.  Patented June 6, 1916.

Application filed February 26, 1915. Serial No. 10,785.

*To all whom it may concern:*

Be it known that I, PERRY BROWN, a citizen of the United States, and a resident of Coraopolis, in the county of Allegheny and State of Pennsylvania, have invented certain new and useful Improvements in Brakes, of which the following is a specification.

This invention relates to improvements in ratchet brakes, particularly of that type in which the operating handle is arranged to drop by gravity to an inactive position. In the preferred embodiment of my invention, when the operating handle is lifted from the vertical to the horizontal position a ratchet wheel is rotated so as to simultaneously move a pulley or drum, thereby winding the brake chain. When the operating handle is released, it drops by gravity to an inactive position.

The invention consists in a brake of this general construction and as hereinafter described and then definitely claimed.

In the drawings accompanying and forming part hereof and which, it will be understood, represent the preferable embodiment of my invention: Figure 1 is a front elevation of a brake made in accordance with my invention, parts being broken away. Fig. 2 is a vertical central section taken through the line 2—2 of Fig. 1. Fig. 3 is a perspective view of two of the parts detached.

Referring now to the details of the drawings by numerals: 1 designates a casing having lugs 3 and 4, preferably cast integrally therewith, these lugs affording a means by which the casing may be secured to the car as by bolts 5 and 6. The casing is provided with a central aperture 8 in its front end and its rear end is preferably closed by a plate 9 provided with a similar aperture 10. These apertures 8 and 10 are for the purpose of receiving a bolt or axle pin 12 which is designed to support the operating mechanism of the brake and also affords a further means by which the casing may be secured to the end of a car (see Fig. 2).

Within the casing 1, upon the bolt or axle pin 12, is supported a ratchet wheel 16. Alongside of said ratchet wheel and preferably cast integrally therewith is a pulley or chain drum 18, the ratchet wheel 16 and the pulley or chain drum 18 revolving together upon the aforesaid bolt or axle pin 12. The casing 1 has an opening 20 in its periphery and a dog 22 projecting from a weighted handle 24 enters the casing and co-acts with the teeth on the ratchet wheel 16, this dog and handle being pivotally supported by a pin 26. This dog 22 therefore holds the ratchet wheel from counter-rotation and yet permits the ratchet wheel to move tooth by tooth as it is rotated. Supported on the bolt or axle pin, preferably alongside of the ratchet wheel 16, is a link 30, this link being provided with a pin or stud 32 upon which is supported an operating handle or lever 34. This handle or lever 34 is provided with a pawl 36 which is adapted to engage the teeth of the ratchet wheel 16 so that when the handle or lever 34 is moved on the pin or stud 32, the first action is to cause the pawl 36 to engage the teeth of the ratchet wheel 16. Any further movement of the handle or lever 34 will cause the pawl 36 and the link 30 to swing upon the bolt or axle pin 12 and thereby rotate the ratchet wheel 16 and the pulley or drum 18. The upper end of the handle or lever 34 is also provided with a curved arm 40 which is substantially of the same curvature as the inside of the casing 1. The casing 1 also has an opening 42 for the purpose of allowing the handle or lever 34 to be moved upwardly to rotate the ratchet wheel 16 and the pulley or drum 18, and when the handle or lever 34 is permitted to drop to the vertical position shown in Fig. 1, the aforesaid arm 40 closes the opening 42 and thus prevents water or snow from entering the casing. The upper end of the handle or lever 34 is provided with a lug 35 and the link 30 is provided with a laterally projecting lug 37, the latter projecting into the path of the lug 35 as seen in Fig. 2. The purpose of this construction is to prevent the pawl 36 from swinging too far away from the teeth of the ratchet wheel 61 and it will be seen that the lug 35 will contact with the lug 37 and prevent the pawl moving any farther away from the teeth than as shown in Fig. 1.

The pulley or drum 18 is provided with a groove 44 in its periphery and a brake chain 46 enters the casing and is connected to a pin 48 (see Fig. 1) in the groove of the pulley or drum 18. This chain 46 extends downwardly and is designed to operate the brake in the usual manner.

In operation, the brakeman grasps the handle or lever 34 and moves it up and down in very much the same way that an old fashioned pump would be operated. On the upward movement of the handle the pawl 36 immediately engages one of the ratchet teeth of the ratchet wheel 16, and the handle swinging upon the link 30 causes the ratchet wheel to rotate. Inasmuch as the ratchet wheel and the pulley or drum 18 move together, the pulley or drum is rotated to wind up the chain 46 and thus apply the brake. If one upward movement of the handle or lever 34 is insufficient to apply the brake, the handle or lever is allowed to drop by gravity to the position shown in Fig. 1, when the operation may be repeated until the brake is sufficiently applied.

Sometimes in putting on a brake, a brakeman finds that he has locked the car wheels and desires to very slightly release the brakes, to avoid flattening the wheels. In such a case, the handle 34 may be raised without permitting the pawl 36 to engage the ratchet teeth until the handle is elevated substantially to its upper position. Then the handle may be moved so that its pawl 36 engages the ratchet teeth and the brakeman can hold the brake by means of the long handle 34 while he moves the weighted handle 24 to release its dog 22 from the ratchet wheel. Then while he holds the weighted handle 24 in its releasing position, he permits the brake chain to pull the ratchet wheel until just the proper pressure is applied to the brakes, when he releases the weighted lever 24 and permits its dog 22 to again engage the ratchet wheel and to hold the brake in its properly adjusted position. By this means an operator is given full control of his car.

In a pending application, Ser. No. 878,905, I have shown a somewhat similar brake, but in that instance the brake is provided with a chain drum which extends outside of the casing. In the present invention I employ a pulley or drum which may, if preferred, be entirely inclosed within the casing. By using the expression pulley or drum I do not limit myself to a grooved device such as shown in the drawing but intend to cover other constructions such, for example, as the ordinary sprocket wheel often employed for this purpose. Hence, it will be obvious that I do not limit my invention to the exact construction shown in my drawing and reference should be made to the appended claims to determine the scope of the invention.

What I claim as my invention is:

1. In a brake, a casing adapted to be secured to a car and having an opening in its periphery, a pulley or drum within said casing, a brake chain connected with said pulley or drum, and an operating handle or lever projecting through and swinging in the opening in the periphery of said casing and arranged to drop by gravity to a substantially vertical position to release said drum and to co-act with said drum to rotate the same when the handle is moved upwardly.

2. In a brake, a casing adapted to be secured to a car and having an opening in its periphery, a pulley or drum and a ratchet wheel within said casing, a brake member operated from said pulley or drum and an operating handle or lever projecting through and swinging in the opening in the periphery of said casing and having a pawl co-acting with said ratchet wheel and arranged to drop by gravity to a substantially vertical position to release said ratchet wheel and drum and to co-act with said ratchet wheel to rotate the same and the drum when the handle is moved upwardly.

3. In a brake, a casing adapted to be secured to a car and having an opening in its periphery, a pulley or drum and a ratchet wheel within said casing, a brake member operated from said pulley or drum, an operating handle or lever projecting through and swinging in the opening in the periphery of said casing and having a pawl co-acting with said ratchet wheel and arranged to drop by gravity to a substantially vertical position to release said ratchet wheel and drum and to co-act with said ratchet wheel to rotate the same and the drum when the handle is moved upwardly, and a dog co-acting with said ratchet wheel to prevent counter-rotation.

4. In a brake, a casing having a flat back adapted to be secured to a car and cylindrical in form with an opening in its periphery, a pulley or drum and a ratchet wheel within said casing, a brake chain connected with said pulley or drum, and an operating handle or lever projecting through and swinging in the opening in the periphery of said cylindrical casing and having a pawl co-acting with said ratchet wheel arranged to drop by gravity to a substantially vertical position to release said ratchet wheel and drum and to co-act with said ratchet wheel to rotate the same and the drum and wind said brake chain when the handle is moved upwardly.

5. In a brake, a casing having a flat back adapted to be secured to a car and cylindrical in form with an opening in its periphery, a pulley or drum and a ratchet wheel within said casing, a brake chain connected with said pulley or drum, an operating handle or lever projecting through and swinging in the opening in the periphery of said cylindrical casing and having a pawl co-acting with said ratchet wheel arranged to drop by gravity to a substantially vertical position to release said ratchet wheel and drum and to co-act with said ratchet wheel to rotate the same and the drum and wind said brake chain when the handle is moved upwardly, and a dog projecting through the cylindrical casing and co-acting with said ratchet wheel to prevent counter-rotation.

6. In a brake, a casing having a flat open back adapted to be secured against an end wall of a car, an axle pin projecting through said casing, a pulley or drum on said axle pin, a chain connecting said pulley or drum with the brake mechanism, and an operating handle or lever projecting within the casing and arranged to drop by gravity to a substantially vertical position to release said drum and to co-act with said drum to rotate the same when the handle is moved upwardly.

7. In a brake, a casing having a flat open back adapted to be secured against an end wall of a car, an axle pin projecting through said casing, a pulley or drum and a ratchet wheel on said axle pin, a chain connecting said pulley or drum with the brake mechanism, and an operating handle or lever projecting within the casing and arranged to drop by gravity to a substantially vertical position to release said ratchet wheel and drum and to co-act with said ratchet wheel to rotate the same and the drum when the handle is moved upwardly.

8. In a brake, a casing having a flat open back adapted to be secured against an end wall of a car, a plate closing the open back of said casing, an axle pin projecting through said casing, a pulley or drum on said axle pin, a chain connecting said pulley or drum with the brake mechanism, and an operating handle or lever projecting within the casing and arranged to drop by gravity to a substantially vertical position to release said drum and to co-act with said drum to rotate the same when the handle is moved upwardly.

9. In a brake, a casing having a flat open back adapted to be secured against an end wall of a car, a plate closing the open back of said casing, an axle pin projecting through said casing, a pulley or drum and a ratchet wheel on said axle pin, a chain connecting said pulley or drum with the brake mechanism, and an operating handle or lever projecting within the casing and arranged to drop by gravity to a substantially vertical position to release said ratchet wheel and drum and to co-act with said ratchet wheel to rotate the same and the drum when the handle is moved upwardly.

10. In a brake, a casing, a drum in said casing, a brake member operated from said drum, a link journaled within the casing, and an operating handle or lever secured to said link and arranged to drop by gravity to a substantially vertical position to release said drum and to co-act with said drum to rotate it as the handle is moved upwardly.

11. In a device of the character described, a casing adapted to be secured to the end of a car, a drum journaled in said casing, a brake member operated from said drum, a link journaled within the casing, and an operating lever or handle secured to said link and arranged to drop by gravity to a substantially vertical position to release said drum and to co-act with said drum to rotate it as the handle is moved upwardly.

12. In a device of the character described, a casing, a drum journaled in said casing, a brake member operated from said drum, a ratchet wheel in said casing and movable with said drum, a link journaled within the casing, and an operating handle or lever secured to said link, said operating handle or lever being arranged to co-act with said ratchet wheel and to drop by gravity to a substantially vertical position to release said ratchet wheel and to co-act with said ratchet wheel and the drum as the handle is moved upwardly.

13. In a device of the character described, a casing, a drum journaled in said casing, a brake member operated from said drum, a ratchet wheel in said casing and movable with said drum, a link journaled within the casing and movable with respect to said drum and ratchet wheel, and an operating lever pivotally supported by said link and having a pawl co-acting with said ratchet wheel, said operating handle or lever being arranged to drop by gravity to a substantially vertical position to release said ratchet wheel and drum and to coact with said ratchet wheel and rotate the same and the drum as the handle is moved upwardly.

14. In a device of the character described, a casing, a drum journaled in said casing, a brake member operated from said drum, a ratchet wheel in said casing and movable with said drum, a link journaled within the casing, an operating handle or lever secured to said link, said operating handle or lever being arranged to co-act with said ratchet wheel and to drop by gravity to a substantially vertical position to release said ratchet wheel and to co-act with said ratchet wheel and the drum as the handle is moved upwardly, and a pawl entering said casing and co-acting with said ratchet wheel to prevent counter-rotation thereof.

15. In a device of the character described, a casing adapted to be secured to the end of a car, a drum journaled in said casing, a brake member operated from said drum a ratchet wheel in said casing and movable with said drum, a link journaled within the casing and movable with respect to said drum and ratchet wheel, an operating lever pivotally supported by said link and having a pawl co-acting with said ratchet wheel, said operating handle or lever being arranged to drop by gravity to a substantially vertical position to release said ratchet wheel and drum and to co-act with said ratchet wheel and rotate the same and the drum as the handle is moved upwardly, and a pawl entering said casing and co-acting with said ratchet wheel to prevent counter-rotation thereof.

16. In a brake, a ratchet wheel, a brake member operated from said wheel, a link journaled in proximity to said ratchet wheel, and an operating handle or lever journaled on said link and arranged to drop by gravity to an inactive position and to co-act with said ratchet wheel to rotate it as the handle is moved upwardly.

17. In a brake, a ratchet wheel and a pulley or drum movable with each other, a brake member operated from said pulley or drum, a link journaled in proximity to said ratchet wheel, and an operating handle or lever journaled on said link and arranged to drop by gravity to a substantially vertical position to release said ratchet wheel and to co-act with said ratchet wheel to rotate it as the handle is moved upwardly.

18. In a brake, a pulley or drum, a link journaled in proximity to said pulley or drum, a brake member operated from said pulley or drum and an operating handle or lever journaled on said link and arranged to drop by gravity to an inactive position and to co-act with said drum to rotate the same as the handle is moved upwardly.

19. In a brake, a casing having an opening in its periphery, a link journaled within the casing, a brake member operated from said brake and an operating handle or lever projecting through and swinging in the opening in said casing and secured to said link, said handle or lever having an arm closing said opening in the casing.

20. In a brake, a casing having an opening in its periphery, a drum in said casing, a brake member operated from said drum, a link journaled in proximity to said drum, and an operating handle or lever projecting through and swinging in the opening in said casing and secured to said link and arranged to drop by gravity to an inactive position, said handle or lever having an arm closing said opening when the handle is in its inactive position.

21. In a brake, a pulley or drum, a brake member operated from said pulley or drum, a link journaled in proximity to said pulley or drum, and an operating handle or lever journaled on said link, said link and said handle having co-acting parts limiting the movement thereof.

22. In a brake, a ratchet wheel, a brake member operated from said wheel, a link journaled in proximity to said ratchet wheel, and an operating handle or lever journaled on said link and having a pawl co-acting with said ratchet wheel, said link and said handle having co-acting parts preventing said pawl from moving too far away from said ratchet wheel.

23. In a brake, a cylindrical casing having an opening in its side and a flat open back, a plate closing said back, a drum journaled in said casing, a brake member operated from said drum, a link journaled within the casing and an operating lever or handle mounted upon said link within said casing and projecting through and swinging in the opening in the periphery of the casing and arranged to drop by gravity to a substantially vertical position to release said drum and to co-act with said drum to rotate it as the handle is moved upwardly in said opening.

24. In a brake, a casing having an opening in its side, a drum journaled in said casing, a brake member operated from said drum, a link journaled within the casing, and an operating lever or handle mounted upon said link within said casing and projecting through and swinging in the opening in the periphery of the casing and arranged to drop by gravity to a substantially vertical position to release said drum and to co-act with said drum to rotate it as the handle is moved upwardly in said opening, one wall of said side opening constituting a stop against which said handle co-acts to prevent the handle swinging too far.

25. In a brake, a casing having an opening in its side, a drum journaled in said casing, a brake member operated from said drum, a ratchet wheel movable with said drum, a link journaled within the casing in proximity to said ratchet wheel, and an operating lever or handle mounted upon said link within said casing and projecting through and swinging in the opening in the side of the casing and arranged to drop by gravity to a substantially vertical position to release said ratchet wheel or to rotate it and the drum as the handle is moved upwardly in said opening, said casing having a stop to prevent said handle from moving too far in the opening in the side of the casing.

26. In a brake, a casing having a flat back adapted to be secured to a support and cylindrical in form with an opening in its periphery, a drum journaled in said casing, a brake chain connected with said drum, a ratchet wheel within said casing and movable with said drum, a link journaled within the casing, and an operating lever or handle mounted upon said link within the casing and projecting through and swinging in the opening in said cylindrical casing, said handle being arranged to drop by gravity to a substantially vertical position and having a pawl co-acting with said drum to rotate it as the handle is moved upwardly in said opening, and said casing having a stop to prevent said handle from moving too far in the opening in the casing when the handle drops by gravity.

27. In a brake, a casing, a drum and ratchet wheel therein, a brake member operated from said drum, a link in the casing adjacent said ratchet wheel, and a handle mounted upon said link in said casing and arranged to drop by gravity to an inactive position, said handle being arranged when moved upwardly to engage and rotate said ratchet wheel in said casing to apply the brake or to slip around said wheel without rotating it.

28. In a brake, a casing, a drum and ratchet wheel therein, a brake member operated from said drum, a link in the casing adjacent said ratchet wheel, and a handle mounted upon said link in said casing and arranged to drop by gravity to an inactive position, said handle being arranged when moved upwardly to engage and rotate said ratchet wheel in said casing to apply the brake or to engage the interior wall of the casing and slip over said wheel without rotating it.

29. In a brake, a casing having a flat back and cylindrical in form, a drum rotatable in said casing, a ratchet wheel rotating with said drum, a link mounted in the casing adjacent to said ratchet wheel, and a handle mounted upon said link in said casing and arranged to drop by gravity to an inactive position, said handle being arranged when moved upwardly to engage and rotate said ratchet wheel or to slip around said wheel without rotating it.

30. In a brake, a casing having a flat back and cylindrical in form, a drum rotatable in said casing, a ratchet wheel rotating with said drum, a link mounted in the casing adjacent to said ratchet wheel, and a handle mounted upon said link in said casing and arranged to drop by gravity to an inactive position, said handle being arranged when moved upwardly to engage and rotate said ratchet wheel or to engage the interior wall of said cylindrical casing and slip over said wheel without rotating it.

31. In a brake, a casing having a flat back and cylindrical in form with an opening in its periphery, a drum rotatable in said casing, a ratchet wheel rotating with said drum, an axle pin passing through said casing and supporting said drum and said ratchet wheel, a link mounted to swing upon said axle pin adjacent to said ratchet wheel, and a handle mounted upon said link within said casing and projecting through and swinging in the opening in the side of said casing and arranged to drop by gravity to a substantially vertical position to release said ratchet wheel or to rotate it as the handle is moved upwardly in said opening.

32. In a brake, a casing having a flat back and cylindrical in form with an opening in its periphery, a drum rotatable in said casing, a ratchet wheel rotating with said drum, an axle pin passing through said casing and supporting said drum and said ratchet wheel, a link mounted to swing upon said axle pin adjacent to said ratchet wheel, and a handle mounted upon said link within said casing and projecting through and swinging in the opening in the side of said casing and arranged to drop by gravity to a substantially vertical position to release said ratchet wheel or to rotate it as the handle is moving upwardly in said opening, said casing having a stop to prevent said handle from moving too far in the opening in the side of the casing.

33. In a brake, a casing having a flat back and cylindrical in form with an opening in its periphery, a drum rotatable in form with an opening in its periphery, a drum rotatable in said casing, a ratchet wheel rotating with said drum, an axle pin passing through said casing and supporting said drum and said ratchet wheel, a link mounted to swing upon said axle pin adjacent to said ratchet wheel, a handle mounted upon said link within said casing and projecting through and swinging in the opening in the side of said casing and arranged to drop by gravity to a substantially vertical position to release said ratchet wheel or to rotate it as the handle is moved upwardly in said opening, and a dog projecting through an opening in the side of the casing to prevent counter-rotation of said ratchet wheel.

In testimony whereof I affix my signature in presence of two witnesses.

PERRY BROWN.

Witnesses:
THOMAS E. ROBERTSON,
JOHN L. FLETCHER.

It is hereby certified that in Letters Patent No. 1,185,974, granted June 6, 1916, upon the application of Perry Brown, of Coraopolis, Pennsylvania, for an improvement in "Brakes," errors appear in the printed specification requiring correction as follows: Page 2, lines 110 and 126, claims 4 and 5, after the word "wheel" insert a comma and the words, *said handle being,* page 4, line 37, claim 19, for the word "brake" read *link;* and that the said Letters Patent should be read with these corrections therein that the same may conform to the record of the case in the Patent Office.

Signed and sealed this 18th day of July, A. D., 1916.

[SEAL.]

R. F. WHITEHEAD.

*Acting Commissioner of Patents.*

Cl. 188—57.